United States Patent

[11] 3,569,960

[72] Inventors James T. Neiswinter
Garden City, N.Y.;
Carl N. Pederson, Westmont; Peter G. Angelopoulos, Westchester, Ill.

[21] Appl. No. 642,449
[22] Filed May 31, 1967
[45] Patented Mar. 9, 1971
[73] Assignee The Pioneer Electric and Research Corporation, Forest Park, Ill.

[54] CODED BINARY SYMBOL GENERATOR
6 Claims, 9 Drawing Figs.

[52] U.S. Cl. 340/347
[51] Int. Cl. G06f 3/00
[50] Field of Search 340/347

[56] References Cited

UNITED STATES PATENTS

| | | | |
|---|---|---|---|
| 2,974,315 | 3/1961 | Lebel et al. | 340/347 |
| 3,204,187 | 8/1965 | Yashim | 340/347 |
| 3,438,024 | 4/1969 | Smith | 340/347 |
| 2,814,006 | 11/1957 | Wilde | 340/347 |
| 3,320,409 | 5/1967 | Larrowe | 340/347 |

*Primary Examiner*—Maynard R. Wilbur
*Assistant Examiner*—Jeremiah Glassman
*Attorney*—Arnold J. De Angelis

ABSTRACT: A voltage divider network with means for selectively and sequentially interconnecting resistors of various ohmic values in one leg thereof to provide discrete voltages, each one of which voltage is associated with a corresponding resistor value. The discrete voltage levels are detected and converted to a binary coded output in accordance with an intelligible encoding of the resistors. For such encoding the different resistor values and discrete voltage steps used are equal in number to the binary code which is to be generated. For example, for a binary code of 2 to the second power ($2^2$), 4 resistors are selectively insertable in the voltage divider network and four different voltage levels detected. For a binary code of 2 to the fourth power ($2^4$), 16 resistance values and voltage levels are utilized. In order to minimize the number of different resistance values and voltage levels needed for a given binary code level, more than one voltage divider with its associated resistors and voltage level detectors may be utilized and "read" simultaneously.

JAMES T. NEISWINTER
CARL N. PEDERSON INVENTOR.(S)
PETER G. ANGELOPOULOS

BY A. J. De Angelis
ATTORNEY.

JAMES T. NEISWINTER
CARL N. PEDERSON INVENTOR.(S)
PETER G. ANGELOPOULOS
BY A. J. De Angelis
ATTORNEY.

JAMES T. NEISWINTER
CARL N. PEDERSON INVENTOR.(S)
PETER G. ANGELOPOULOS
BY A. J. De Angelis
ATTORNEY.

JAMES T. NEISWINTER
CARL N. PEDERSON *INVENTOR.(S)*
PETER G. ANGELOPOULOS

BY A. J. De Angelis
*ATTORNEY.*

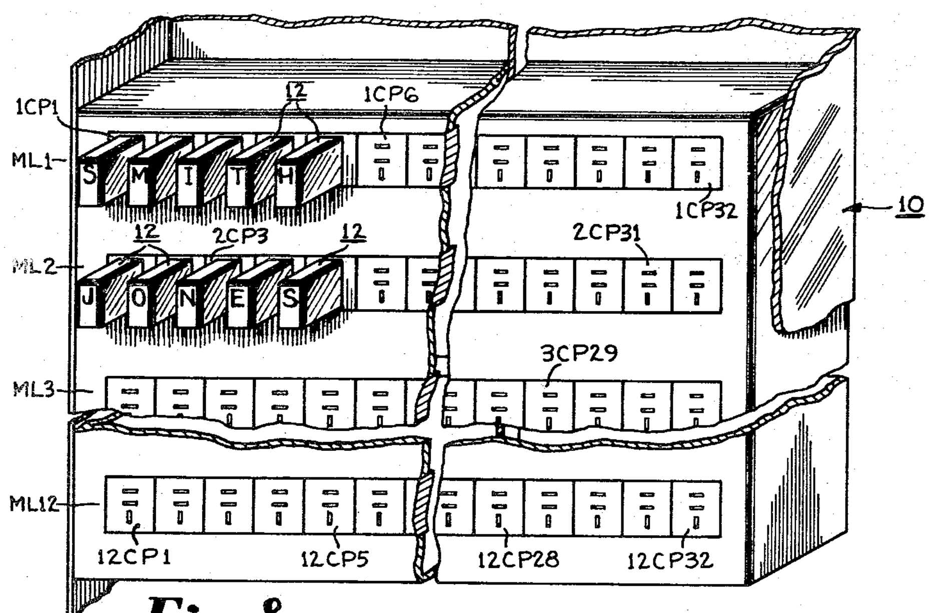
Fig. 8.
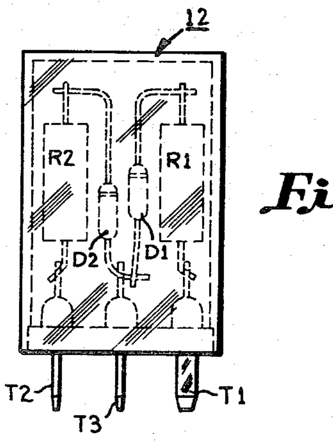
Fig. 9.
| CHIP ENCODING | A | B | C | D | E | F | G | H | I | J | K | L | M | N | O | P |
|---|---|---|---|---|---|---|---|---|---|---|---|---|---|---|---|---|
| V1 | 16.2 | 9.3 | 21.9 | 9.3 | 9.3 | 9.3 | 21.9 | 4.8 | 21.9 | 16.2 | 16.2 | 21.9 | 4.8 | 4.8 | 4.8 | 21.9 |
| V2 | 4.8 | 19.9 | 9.3 | 12.7 | 4.8 | 9.3 | 19.9 | 24 | 6.5 | 12.7 | 9.3 | 21.9 | 16.2 | 9.3 | 19.9 | 24 |
| P1 | 1 | 1 | | 1 | 1 | 1 | | | | 1 | 1 | | | | | |
| P2 | 2 | | 2 | | | | 2 | | 2 | 2 | 2 | 2 | | | | 2 |
| P3 | | | 3 | | | 3 | | 3 | 3 | | 3 | | 3 | 3 | | 3 |
| P4 | | 4 | 4 | 4 | | 4 | 4 | | | 4 | 4 | | 4 | 4 | 4 | |
| P5 | | 5 | | | | | 5 | 5 | | | | 5 | 5 | | 5 | 5 |
| R1 | 160K | 43K | 680K | 43K | 43K | 43K | 680K | 9.1K | 680K | 160K | 160K | 680K | 910K | 910K | 910K | 680K |
| R2 | 910K | 360K | 43K | 82K | 910K | 43K | 360K | ∞ | 20K | 82K | 43K | 680K | 160K | 43K | 360K | ∞ |
| CHIP ENCODING | Q | R | S | T | U | V | W | X | Y | Z | ≈ | ↓ | – | ≡ | < | ↑ |
|---|---|---|---|---|---|---|---|---|---|---|---|---|---|---|---|---|
| V1 | 16.2 | 21.9 | 9.3 | 4.8 | 16.2 | 21.9 | 16.2 | 9.3 | 9.3 | 9.3 | 4.8 | 16.2 | 4.8 | 21.9 | 4.8 | 16.2 |
| V2 | 24 | 12.7 | 6.5 | 21.9 | 6.5 | 16.2 | 21.9 | 16.2 | 24 | 21.9 | 4.8 | 16.2 | 6.5 | 4.8 | 12.7 | 19.9 |
| P1 | 1 | | 1 | | 1 | | 1 | 1 | 1 | 1 | | 1 | | | | 1 |
| P2 | 2 | 2 | | | 2 | 2 | 2 | | | | | 2 | | 2 | | 2 |
| P3 | 3 | | 3 | | 3 | 3 | | 3 | 3 | | | 3 | 3 | | | |
| P4 | | 4 | | | | 4 | | 4 | | | | 4 | | | 4 | 4 |
| P5 | 5 | | | 5 | | 5 | 5 | 5 | 5 | 5 | | 5 | | | | 5 |
| R1 | 160K | 680K | 43K | 910K | 160K | 680K | 160K | 43K | 43K | 43K | 9.1K | 160K | 910K | 680K | 910K | 160K |
| R2 | ∞ | 82K | 20K | 680K | 20K | 160K | 680K | 160K | ∞ | 680K | 9.1K | 160K | 20K | 910K | 82K | 360K |
Fig. 7.
JAMES T. NEISWINTER
CARL N. PEDERSON INVENTOR(S)
PETER G. ANGELOPOULOS
BY G. J. De Angelis
ATTORNEY

CODED BINARY SYMBOL GENERATOR

The invention relates to generators of intelligible coded symbols and especially to such generators of binary coded electrical signals.

Binary coded symbol generators are already well-known in the art. Input means to such generators include perforated tape, magnetic tape, keyboard and stepping switch mechanisms; all of which have inherent limitations of speed of operation and flexibility. In addition, such mechanisms are continually subject to mechanical wear, necessitating periodic maintenance and replacement, sometimes at inopportune times.

It is, therefore, desirable to provide binary coded symbol generators which are economical in manufacture and operation and are reliable, may be readily preset to provide selectively any one of various binary coded messages, and operate at practically unlimited electronic speeds.

The invention involves providing a voltage divider having two legs into one of which legs any one of various encoded resistors may be selectively inserted to provide associated voltage levels at a "takeoff" point in the voltage divider. The voltage levels are in discrete steps, one from the other, such that for proper operation the resistors need not be of close ohmic tolerance. The voltage levels at the "takeoff" point are according to a predetermined binary coding of the resistors and indicate such coding. Means are provided to recognize each of the voltage ranges and provide a binary coded output at output terminals (one terminal for each level of the binary code level used) in the form of coded combinations of the presence or absence of electrical signals at such output terminals.

In carrying out the invention, according to a preferred embodiment, a generator for a five level binary code is equipped with two voltage divider networks. A first one of the voltage divider networks is associated with two output terminals and the second with three. Various resistors selected of different ohmic values predetermined to provide associated voltage steps at a "takeoff" point of their associated voltage dividers are selectively insertable into their respective voltage divider networks. The resistors insertable into the first divider are of four different ohmic values, representing the binary ($2^2$), to provide four voltage steps. Similarly, the resistors insertable into the second divider are of eight different ohmic values to provide eight voltage steps representing the binary ($2^3$). A recognizer circuit for each divider converts a detected voltage step to a corresponding predetermined combination of the absence or presence of voltage signals at the aforementioned output terminals. This provides 32 ($2^5$), possible predetermined combinations of the absence or presence of voltage signals at the total of five output terminals, any one of which combinations may be selectively generated by simply inserting the associated encoded resistors in the two divider networks.

Means are provided to generate a message by automatically inserting encoded resistors, representing different characters forming the message, sequentially into the voltage divider networks, causing a binary five level coded output of the message, character per character, at the output terminals. In addition, several lines of messages may be preestablished for selective generation.

In the preferred embodiment, the encoded resistors, controlling the voltage steps, are illustrated as being "plug-in" units for ready insertion into message lines in the manner of "-type" in a printing machine, although, it is to be understood, the invention is not so limited.

It is also within the scope of the invention to provide binary coded messages of more or less than five levels. This may be done by using additional or fewer voltage dividers and sets of associated resistors. For example, say for an eight level code, a third voltage divider with eight more associated resistors and a recognizer is added to provide eight more combinations of electrical signals at three additional output terminals for a total of 256 possible combinations (binary $2^8$) of signals at the eight output terminals of the generator.

Alternately, a greater or lesser number of differently valued resistances may be provided for each of the two voltage dividers. For example, say for an eight level binary coded output, 16 different values of resistance are insertable into each of two voltage dividers to provide, at the "takeoff" point of each, 16 different voltage levels. In such an arrangement a recognizer for each divider is provided with four output terminals at which the presence or absence of electrical signals provides the various combinations indicating the encoding of the resistors inserted in the associated voltage divider at any given time. The different permutations, combinations of signals possible at the total of eight output terminals equals 256 or binary ($2^8$).

Features and advantages of the invention will be seen from the above and from the following description of operation when considered in conjunction with the drawings and from the appended claims.

IN THE DRAWINGS

FIGS. 1, 2 and 3 taken together provide a simplified schematic, combination line and block diagram of a complete system for generating binary coded symbols, and embodying the invention;

FIG. 7 is a representation in table form of the five level binary coding used in the subject system for the characters and symbols shown in the third from top horizontal row;

FIG. 8 is a simplified, diagrammatic, fragmentary illustration of a portion of a typical signal generator panel; and FIG. 9 is a simplified diagrammatic representation of a "-plug-in" component, termed a "chip," which is used in the subject system and showing the electrical elements contained in the "chip" in phantom.

Figure 1:
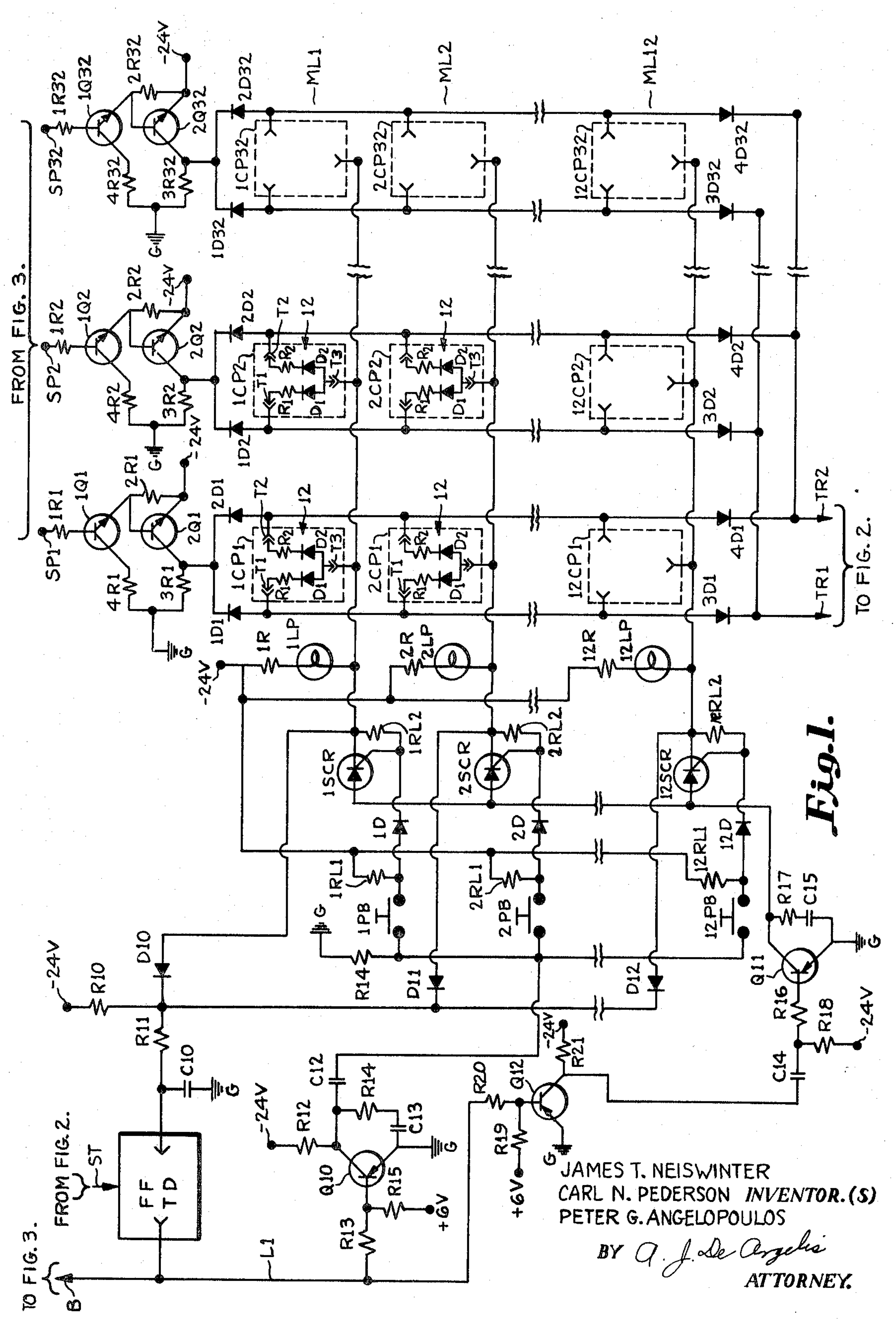

For convenience, the subject invention will be described as applied to a generator of a five level binary code, utilizing two voltage divider networks into which encoded resistors in the form of "plug-in" units are selectively insertable to provide a message to be generated, it being understood, nevertheless, that the invention is not so limited and without departing from the spirit and scope thereof is applicable to similar generators of binary code levels other than five and to those utilizing less or more than two voltage dividers with their associated "plug-in" resistor units. It should also be understood that, although in the preferred embodiment shown there is utilized four different values of resistors insertable in a first voltage divider of the signal generator and eight resistors of different values in the second voltage divider to obtain the four and eight voltage levels, respectively necessary for the 2 and 3 binary outputs of the voltage dividers, it is within the scope of the invention to provide other number of voltage levels and associated resistor values for each voltage divider to provide various binary coded outputs.

In the drawings, resistors are generally designated R, capacitors C, diodes D, lamps LP, ground connections G, pushbuttons PB, silicon controlled rectifiers SCR, and transistors Q, with prefix and suffix numeral and alpha designations being added thereto to differentiate similar circuit components one from the other. Supply voltages are indicated by the letter V preceeded with the magnitude of the voltage indicated numerically and its polarity by either the plus + or minus − signs. Electrical interconnections between associated FIGS. are indicated by alpha, numeric designations of the interconnecting wires and "TO" and "FROM" legends.

The FIG. 1 circuitry is arranged in accordance with the signal generator panel shown in FIG. 8 and generally designated 10 therein. Panel 10 is provided with 12 horizontal rows, each containing 32 side-by-side sockets (CP1—CP32) of the three hole type for receiving resistor-diode networks of the "plug-in" type, generally designated 12. The horizontal rows of sockets may be termed "message lines" and are designated ML1 to ML12. The sockets in each message line are designated with a numeral prefix designation corresponding to the message line in which they are disposed and with a suffix numeral indicating their respective positions in the message line reading from left to right.

The "plug-in" resistor-diode networks 12 may be termed "chips." Each chip 12 comprises two resistors R1, R2 (FIG. 9) and two blocking diodes D1, D2 encapsulated into a small rectangular box interconnected, as shown, to terminals (or prongs) T1, T2, T3 of the chip.

Resistors R1, R2 of the chips 12 are selected of ohmic values predetermined to encode each chip to cause the subject system to generate a specific binary coded symbol for each particular chip, as will be described hereinafter. The ohmic values expressed in kilohms of resistors R1, R2 provided to encode particular chips for various symbols are indicated in the table of FIG. 7. For example, a chip 12 encoded to cause the system to generate a five level binary coded output corresponding to the letter A is provided with a resistor R1 of 160 kilohms and resistor R2 of 9.1 kilohms, as can be seen from the table of FIG. 7. The symbol for which each chip is encoded is stamped on its back, as is indicated in the chips 12 shown in FIG. 8.

Chips 12 spelling out a message may be selectively inserted in message lines ML1—ML12 (FIG. 8) in the manner of setting up type in a printer. The panel of FIG. 8 is shown with five chips 12 inserted in message line ML1 in the first five sockets 1CP1 through 1CP5 to spell the message SMITH. Similarly, chips spelling the word JONES are shown inserted in message line ML2 in the first five sockets 2CP1 to to 2CP5.

By looking at the table of FIG. 7 it can be seen that the encoding of the chips is accomplished with only four different ohmic values used for resistor R1 and only eight ohmic values used for resistor R2, namely:

| R1 | R2 | |
|---|---|---|
| 9.1 K | 9.1 K | 160 K |
| 43 K | 20 K | 360 K |
| 160 K | 43 K | 680 K |
| 680 K | 82 K | infinite |

It may be noted that infinite resistance (open circuit) is used for one value of resistor R2 but not for resistor R1. However, as will be seen hereinafter, the open circuit resistance condition for resistor R1 (infinite) is used to stop the subject signal generation.

The sockets of the message lines of FIG. 8 are interconnected in the circuitry of FIG. 1 wherein they are indicated within broken-line outlines in accordance with the designations used in FIG. 8; only three of the 32 sockets being illustrated for each of three message lines ML1, ML2, ML12. Intermediate chip sockets and message lines not shown are indicated by broken-line connections.

A pushbutton (1PB—12PB) is provided for each message line (ML1—ML12). The pushbuttons are of the spring return, normally open contact type and are used to select a message line for generation of the message provided by the chips inserted therein, as will be described hereinafter. A lamp (1LP—12LP) is supplied for each message line (ML1—ML12) for indicating when its associated line has been selected for message generation. The numeral prefixes appended to the pushbutton and lamp designations indicate the message line with which they are associated.

Figure 4:
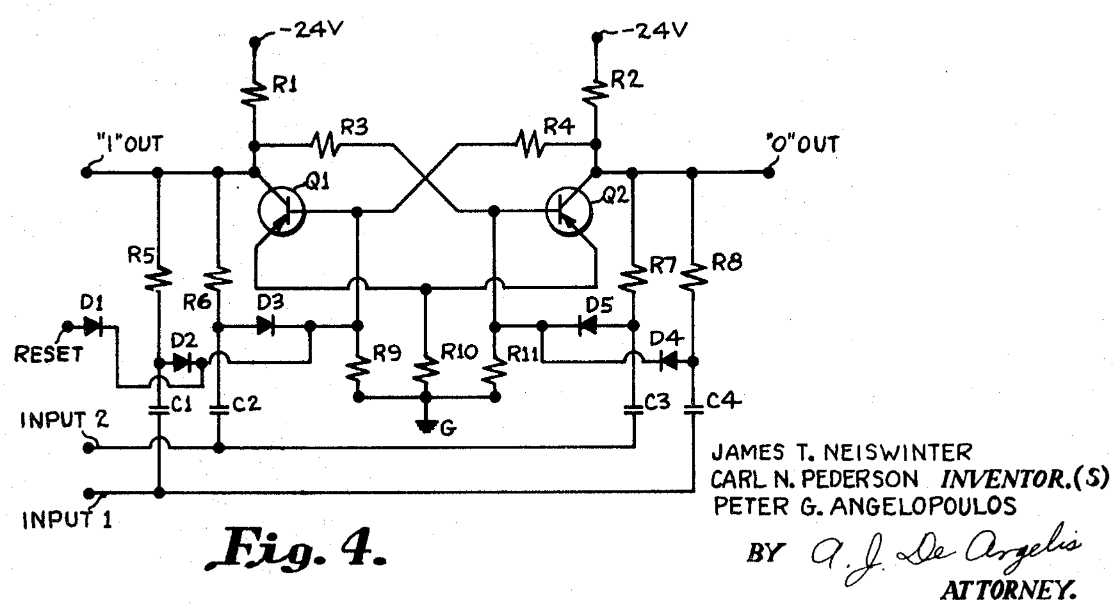
FIG. 4 is a simplified schematic wiring diagram of a standard "flip-flop" circuit used in the subject system; and shown in the circuitry as blocks designated FF.

One tested embodiment of the subject system used the applied voltages indicated in the circuitry and the encoding for resistors R1, R2 of the chips in accordance with the table of FIG. 7. Other circuit components used were: In FIG. 4, diodes of the IN41—48 or IN914 types, in the remainder of the circuits diodes of the 584 type, silicon controlled rectifiers of the GEC6F type, all NPN transistors of the 2N3567 type, while PNP transistors of the S-2031 type, except the transistor designated Q11 in FIG. 1 which was of the 2N1194 type. Resistors R20 and R22 in FIG. 2 were selected of 100 kilohms each.

The five level binary coded output of the subject generator system appears at its five output terminals, designated P1 through P5 (FIG. 2), in the form of coded combinations of the presence or absence of a voltage signal of approximately −24 volts at each of the output terminals at any given time. The combinations of conditions of output terminals P1 through P5 available number $2^5$ or 32 possible combinations. The coding of these 32 conditions to represent various symbols is shown in the table of FIG. 7. In the table a numeral in a box associated with an output terminal (P1—P5) indicates the presence of a voltage signal (−24 volts) at such terminal, while the absence of a numeral in an associated box indicates the absence of a voltage signal, or approximately −2 volts at such terminal. For example, the binary coded output at terminals P1—P5 representing the letter S, as can be seen from the table of FIG. 7, requires that the condition of output terminals P1—P5 (FIG. 2) be such that voltage signals (−24 volts) appear at terminals P1 and P3, while none (−2 volts) appear at the remaining three terminals P2, P4 and P5.

Figure 2:
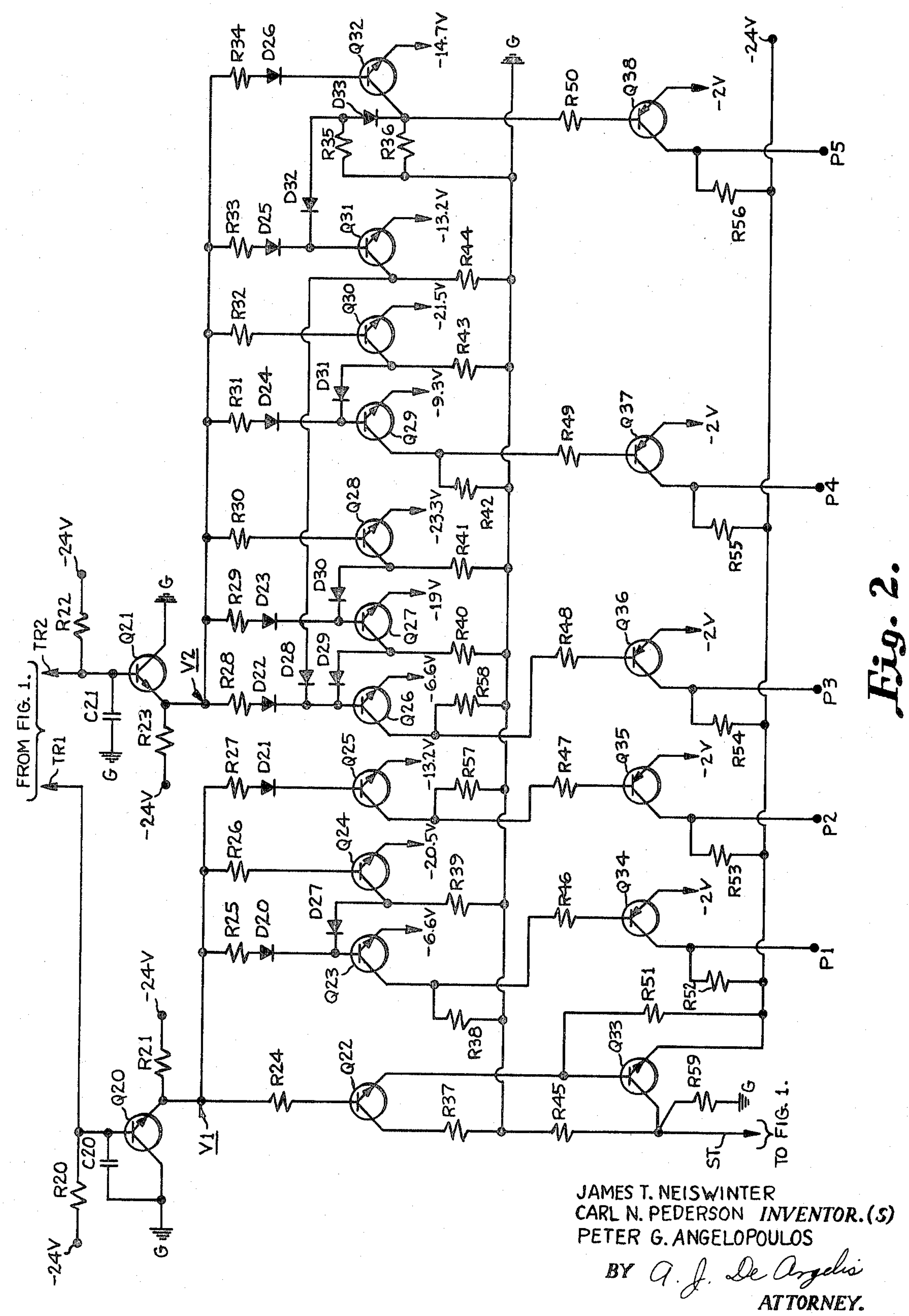
Figure 3:
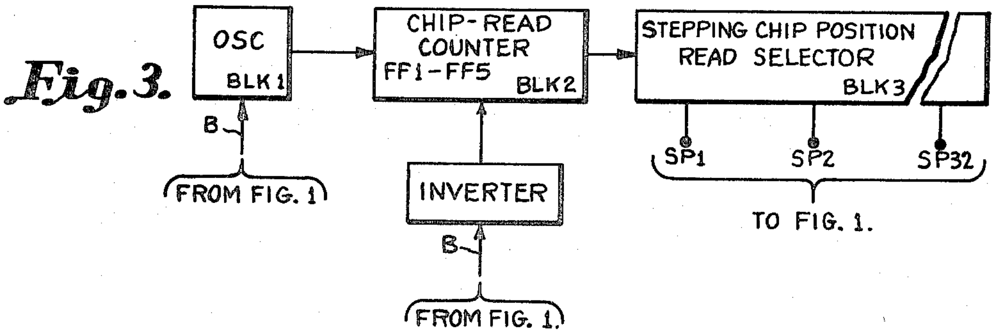

To illustrate the operation of the system with reference to FIGS. 1 through 3, first assume that power, as is indicated on the circuits, is applied thereto from any convenient source (not shown). Also assume that the system is in "reset" condition and there are no chips 12 inserted in the various message lines (ML1—ML12). The initial condition of the system circuitry then is as follows: Flip-flop TD (FIG. 1) applies a −24 volt signal over line B to oscillator OSC (BLK 1, FIG. 3) blocking the oscillator output to the Chip-Read Counter flip-flops FF1—FF5 (BLK 2). Chip-Read Counter flip-flops FF1—FF5 (BLK 2) are in reset condition, causing the Stepping Chip Position Read Selector (BLK 3) to apply −24 volts over its output terminal SP1 to the first chip socket position of the message lines, while applying −6 volts over all the other output terminals SP2—SP32 to the other chip socket positions. First chip socket position transistors 1Q1, 1Q2 (FIG. 1) are biased by the −24 volt signal applied through resistor 1R1 to the base of transistor 1Q1 to nonconducting condition. All the other chip position transistors (1Q2, 2Q2 through 1Q32, 2Q32) are biased to conducting condition by the −6 volt signals applied to their respective bases through their respective base resistors 1R2 through 1R32.

Flip-flop TD also applies a −24 volt signal over line L1 through base resistor R13 and to the base of transistor Q10 and through base resistor R20, to the base of transistor Q12 biasing both transistors into conducting condition. Transistor Q10 in conducting through its emitter-collector circuit places ground potential G at the left-hand side of capacitor C12 which is common to the 12 pushbutton circuits for message lines ML1—ML12.

Similarly, transistor Q12, in conducting, through its emitter-collector circuit places ground potential G at the left-hand side of capacitor C14 in the base circuit of transistor Q11. However, transistor Q11 is placed in conducting condition by the −24 volt bias applied to its base through resistors R18, R16. Transistor Q11, in conducting, places ground G through its emitter-collector circuit at the anodes of each of the silicon controlled rectifiers 1SCR—12SCR for message lines ML1—ML12.

The cathode of each silicon controlled rectifier (1SCR—12SCR) is, in turn, connected to a −24 volt potential through its associated indicating lamp (1LP—12LP) and current limiting resistor (1R—12R). The silicon controlled rectifiers are, thus, prepared for firing upon the selective application of a firing pulse to their respective gates through the associated pushbuttons 1PB—12PB, as will be later described.

Transistors Q20, Q21 (FIG. 2) are in nonconducting condition due to the −24 volt bias applied to their respective bases through resistors R20, R22, respectively.

The −24 volt signal at the base circuits of transistors Q20, Q21 is applied over lines TR1, TR2 to the cathodes of diodes 3D1, 4D1 through 3D32, 4D32 (FIG. 1) at the bottom of the chip socket circuits for positions 1 through 32. These diodes are all in "open" condition due to the absence of a driving potential at their respective anodes. Similarly, diodes 1D1, 2D1 through 1D32, 2D32 at the top of the chip socket circuits for positions 1 through 32 are also open due to the absence of a driving potential at their respective anodes. These blocking diodes (1D1, 2D1, through 1D32, 2D32 at the top and 3D1, 4D1 through 3D32, 4D32 at the bottom) effectively electrically isolate all the chip sockets (CP1—CP32) in all the message lines (ML1—ML12) from themselves and the remainder of the system circuitry.

This isolation exists even under conditions where chips 12 are inserted into chip sockets. For example, next assume that 5 chips 12 encoded for the letters spelling the word SMITH are inserted in message line ML1 in the first five chip sockets 1CP1 through 1CP5 in the proper sequence to spell the message SMITH. Similarly, assume that chips encoded for the name JONES are inserted in message line ML2 in proper sequence in the first 5 chip sockets 2CP1—2CP5. Insertion of an S encoded chip 12 in socket 1CP1 places (through the chip diodes and resistors D1, R1 and D2, R2) a −24 volt signal from the lamp circuit of message line ML1 (through resistor 1R and lamp 1LP) at the anodes of top and bottom blocking diodes 1D1, 2D1 and 3D1, 4D1, respectively of the first sockets (1CP1—12CP1). However, top diodes 1D1 and 2D1 remain open, since they are back biased at their cathodes through nonconducting transistor 2Q1 which applies ground potential G through resistor 3R1 to their respective cathodes. Bottom diodes 3D1, 4D1 also remain open, since a −24 volt potential, as was previously described, is also impressed over lines TR1, TR2 to their respective cathodes.

It can be seen that the J encoded chip 12 inserted into socket 2CP1 affects the circuitry in the same manner as the S chip 12 in socket 1CP1.

The M encoded chip 12 in the second socket 1CP2 of message line ML1 also places (through its resistors and diodes R1, D1 and R2, D2) a −24 volt signal (from the lamp circuit of message line ML1) at the anodes of top and bottom blocking diodes 1D2, 2D2 and 3D2, 4D2, respectively, for the second sockets 1CP2—12CP2 of the message lines. Since, as was previously stated, second socket position transistor 2Q2 is in conducting condition, a −24 volt signal is applied through its emitter-collector circuit to the respective cathodes of top blocking diodes 1D2, 2D2, maintaining them in "open" condition. The bottom blocking diodes 3D2, 4D2 also remain "open," due to the −24 volt signal applied to their respective cathodes over lines TR1, TR2, as was previously described. It can also be seen that the remaining inserted chips 12 affect the socket circuits in the same way. Thus, the insertion of chips 12 in any sockets (CP1—CP32) and message line (ML1—ML12) is without effect at this time.

With transistors Q20 and Q21 (FIG. 2) in nonconducting condition −24 volts is applied through resistors R21, R23 to points V1, V2, respectively, of the voltage recognizer circuitry of FIG. 2. Recognizer transistors Q22 to Q38 are placed by such voltages in condition to provide −24 volt signals at generator output terminals P2, P3 and P5 and substantially a 0 volt signal (−2 volt) at output terminals P1 and P4. This is effected as follows: Taking the condition of output terminal P1 first, −24 volts is applied through resistors R21, R25 and diodes D20 to the base of transistor Q23, and through resistors R21, R26 to the base of transistor Q24. With −20.5 volts at its emitter, transistor Q24 is maintained in nonconducting condition, causing ground potential G to be applied through resistor R39 and diode D27 to the base of transistor Q23. This causes transistor Q23 to conduct through its emitter-collector circuit, since it is biased at its emitter at −6.6 volts. Transistor Q23, in conducting, applies −6.6 volts through its emitter-collector circuit and resistor R46 to the base of transistor Q34. With −2 volts at its emitter, transistor Q34 is, in turn, also caused to conduct, applying a −2 volt signal (taken as the absence of signal) at generator output terminal P1.

Generator output terminal P4 is supplied with a −2 volt signal in the same manner as just described for terminal P1. That is, the voltage of −24 volts at point V2 is applied to the base of transistor Q30 through resistor R32. With −21.5 volts at its emitter this transistor is maintained in nonconducting condition, causing ground potential G to be applied through resistor R43 and diode D31 to the base of transistor Q29. Transistor Q29 with −9.3 volts applied to its emitter is, thus, caused to conduct, applying −9.3 volts through its emitter-collector circuit and resistor R49 to the base of transistor Q37. This causes transistor Q37 to follow transistor Q39 into conducting condition. Transistor Q37, in conducting, applies −2 volts through its emitter-collector circuit to output generator terminal P4.

The −24 volts at point V1 is also applied through resistor R27 and diode D21 to the base of transistor Q25 associated with output terminal P2. With −13.2 volts applied to its emitter, transistor Q25 is, thus, biased to nonconducting condition. This places ground potential through resistors R57 and R47 to the base of transistor Q35. With −2 volts applied to its emitter, transistor Q35 is, thus, also biased to nonconducting condition, causing −24 volts to be applied through resistor R53 to generator output terminal P2.

The −24 volts at point V2 is also applied through resistor R34 and diode D26 to the base of transistor Q32 associated with output terminal P5. With −14.7 volts at its emitter, transistor Q32 is biased to a nonconducting condition, causing ground potential G to be applied through resistors R36 and R50 to the base of transistor Q38. Transistor Q38 with −2 volts at its emitter is, thus, also biased to nonconducting condition, causing −24 volts to be applied through resistor R56 to generator output terminal P5.

The signal at generator output terminal P3 depends on the conditions of interrelated transistors Q26, Q27, Q28 and Q31, Q32. As was just described, transistor Q32 is in nonconducting condition. This causes ground potential G to be applied through resistor R35 and diode D32 to the base of transistor Q31. With −13.2 volts at its emitter, transistor Q31 is thus, biased to conducting condition, applying −13.2 volts through its emitter-collector circuit and diode D28 to the base of transistor Q26. Since the emitter of transistor Q26 is at −6.6 volts the application of −13.2 volts to its base is without effect.

Associated transistor Q28 also has −24 volts applied from point V2 through resistor R30 to its base. With −23.2 volts at its emitter, transistor Q28 is maintained in nonconducting condition, causing ground potential G to be applied through resistor R41 and diode D30 to the base of associated transistor Q27. With ground potential at its base and −19 volts at its emitter, transistor Q27 is caused to conduct. Transistor Q27, in conducting, applies the −19 volts at its emitter through its emitter-collector circuit and diode D29 to the base of transistor Q26. This −19 volt potential is also ineffective on transistor Q26. Transistor Q26, thus, remains in nonconducting condition, causing ground potential G to be applied through resistors R58 and R48 to the base of transistor Q36. Transistor Q36 with −2 volts at its emitter, is, thus biased to nonconducting condition, causing −24 volts to be applied through resistor R54 to generator output terminal P3.

It may be noted by looking at the table in FIG. 7 that the initial condition of signals at generator output terminals P1 through P5 is, inadvertently, the same as the binary coded combination at such terminals which denotes the symbol P. That is the absence of a voltage signal at output terminals P1 and P4 and the presence of a voltage signal at output terminals P2, P3, and P5 is the binary code for the letter P. This is due to the fact that insertion of a chip encoded for the letter P and activation of the generator to provide this binary coded output causes, as will be later described, a voltage of 21.9 volts to appear at point V1 in FIG. 2, and 24 volts at point V2 in FIG. 2, which voltage signals closely approximate the initial voltage signals of −24 volts at such points.

The last initial condition of the circuitry to be described is that of transistors Q22, Q33 (FIG. 2) which are associated with the recognizer circuit to provide a stop pulse over line ST to flip-flop TD in FIG. 1 to end message transmission, as will be described hereinafter. The −24 volts signal at point V1 is applied to the base of transistor Q22 through resistor R24. A −24 volt signal is also applied through resistor R51 to the emitter of transistor Q22, maintaining the transistor in nonconducting condition. This −24 volts is also applied through resistor R51 to the base of transistor Q33 which is also maintained in nonconducting condition due to the −24 volts applied directly to its emitter. With transistor Q33 in nonconducting condition ground potential G is applied through resistor R59 over line SP to flip-flop TD of FIG. 1, insuring that the flip-flop is in reset condition.

Next assume that pushbutton 1PB (FIG. 1) is momentarily actuated to closed condition, selecting message line ML1 for binary coded generation of its message SMITH, character by character. Pushbutton 1PB, in closing, places a ground pulse on the gate of rectifier 1SCR associated with message line ML1; the ground pulse being applied through transistor Q10, capacitor C12, pushbutton 1PB (closed) and diode 1D. Since, as was previously described, all the silicon controlled rectifiers (1SCR—12SCR) are biased at their anode-cathode circuits to conduct, the ground pulse on the gate of rectifier 1SCR causes it to conduct through its anode-cathode circuit.

Rectifier 1SCR, in conducting, transfers ground potential G (which, as was previously described, is at its anode through presently conducting transistor Q11) to its cathode. With ground potential G at the cathode of rectifier 1SCR, associated message line lamp 1LP is placed across −24 volts to ground G through resistor 1R, causing that lamp to illuminate, indicating that message line ML1 has been selected for the generation in code of its message.

Simultaneously, ground potential G is also applied from the cathode of rectifier 1SCR to the anode of diode D10, causing diode D10 to conduct and apply ground potential G to the junction of resistors R11, and R10. This causes a positive going pulse to be applied to the input of flip-flop TD through resistor R11 causing the output of flip-flop TD to change from the −24 volts previously described to approximately −4 volts. This −4 volts is applied over line B to oscillator OSC (FIG. 3, BLK 1), unblocking its output. Oscillator OSC feeds predetermined timed pulses to the Chip-Read Counter (BLK 2), as will be described later, until the end of generation of the message of line ML1.

The −4 volt output of flip-flop TD is also applied over line L1 to the left side of resistor R13 in the base circuit of transistor Q10. This causes a positive potential to be applied from the +6 volt supply through resistor R15 to the base of transistor Q10, causing transistor Q10 to go to nonconducting condition. As transistor Q10 ceases to conduct, −24 volts is applied to the junction of capacitor C12 and resistor R14 through resistor R12. This prevents further actuation of any pushbutton (1PB—12PB) from applying ground potential G to the gate of any of the rectifiers (1SCR—12SCR) and, thus, serves as an interlock, preventing inadvertent actuation of any other pushbutton from affecting generation of the selected message of line ML1.

It may be noted that rectifier 1SCR, once fired by the previously described gate pulse, remains in conducting condition after pushbutton 1PB is released and reopens its contacts.

The −4 volt output of flip-flop TD is also applied to the base circuit of inverter transistor Q12, causing it to go to nonconducting condition. As inverter transistor Q12 becomes nonconducting, −24 volts is applied through resistor R21 to the base circuit of transistor Q11, but without effect, since, due to the −24 volts also applied through resistor R18, transistor Q11 remains in conducting condition.

At the same time that message line lamp 1LP lights, ground potential G is also applied from the cathode of presently conducting rectifier 1SCR of selected message line ML1 to the socket holes for receiving chip prongs T3 in all chip sockets 1CP1—1CP32 in message line ML1. From the table of FIG. 7 it is seen that the chip encoded for the first character S of the selected message, which chip is presently in chip socket 1CP1, (FIG. 1) is provided with a resistor R1 of 43 kilohms and resistor R2 of 20 kilohms. Since, as was previously stated, transistor 2Q1 associated with the first chip sockets is presently in nonconducting condition, ground potential G appears through resistor 3R1 at the cathodes of diodes 1D1, 2D1, causing these diodes to remain "open."

With diodes 1D1, 2D1, in "open" condition the S chip resistors R1, R2 and their respective blocking diodes D1, D2 are connected into associated voltage divider circuits as follows: The voltage divider for resistor R1 in socket 1CP1 extends from the emitter of transistor Q11 through rectifier 1SCR, chip prong T3, diode D1, resistor R1, chip prong T1, bottom diode 3D1 now conducting and over line TR1 to the base circuit of transistor Q20 (FIG. 2), extending through resistor R20 to the −24 volt supply. Similarly, the voltage divider circuit for chip resistor R2 in chip socket 1CP1 (FIG. 1) extends from the emitter of transistor Q11, through rectifier 1SCR chip prong T3, diode D3, resistor R2, chip prong T2, bottom blocking diode 4D1 now conducting and over line TR2 to the base circuit of transistor Q21 (FIG. 2) extending through resistor R22 to the −24 volt supply.

In the first described voltage divider circuit the ohmic value of 43 kilohms of S chip resistor R1 is placed in series with resistor R20 (FIG. 2) of 100 kilohms and across −24 volts. This causes a voltage to appear at the intersection of resistors R1 and R20 across diode 3D1 and the base of transistor Q20 which causes the transistor to transfer its base voltage potential (which now is approximately −9.3 volts) to its emitter. Transistor Q20 functions as an emitter follower. Similarly, in the second described voltage divider the ohmic value of S chip resistor R2 of 20 kilohms is placed in series with resistor R22 (FIG. 2) of 100 kilohms and across −24 volts. This causes transistor Q21, as an emitter follower, to conduct at a level which places a potential of −6.5 volts at point V2. As is indicated in the table of FIG. 7, these two voltages (V1 at −9.3 volts and V2 at −6.5 volts) are detected by the recognizer circuitry of FIG. 2 as the encoding of the character S. This causes the recognizer to provide a binary coded output at generator output terminals P1 through P5 (in the form of the presence or absence of voltage signals at such terminals) in predetermined coded combinations representing the character S for the chip inserted in chip socket 1CP1 (FIG. 1) of first message line ML1, as will be described shortly.

It should be noted that the chips 12 presently in the other chip sockets 1CP2 through 1CP5 of the selected message line ML1 do not affect the described voltage dividers circuits established for resistors R1, R2 of the S encoded chip in socket 1CP1. This is so since, as was previously stated, their associated chip socket transistors 2Q2 through 2Q5 are presently in conducting condition and, thus, interconnect the other chip resistors (R1, R2) and their respective blocking diodes (D1, D2) for the chips in sockets 1CP2 through 1CP5 from ground G to the −24 volts at their respective emitters. For example, taking the chip encoded M inserted in second socket 1CP2, its associated resistors and diodes are connected in two parallel paths extending from the emitter of transistor Q11 through rectifier 1SCR, chip prong T3, thence through diode D1, resistor R1, chip prong T1, diode 1D2 and the parallel path of diode D2, resistor R2, chip prong T2, diode 2D2, through the emitter-collector circuit of conducting transistor 2Q2 to −24 volts. This causes the chip resistors for chip M to be electrically isolated from the voltage dividers for the first chip S in socket 1CP1 by keeping the bottom blocking diodes 3D2, 4D2 in "open" condition. The same is true for the remaining chips in sockets 1CP3 to 1CP5.

Next will be described the reaction of the recognizer circuitry of FIG. 2 to the presently present potentials of −9.3 volts at point V1 and −6.5 volts at point V2. The −9.3 volts at point V1 is applied through resistor R24 to the base of transistor Q22, causing cascaded transistors Q22 and Q33 to be biased into conducting condition due to the −24 volt potential at their emitters.

As transistor Q33 conducts, a potential of −24 volts is applied through its emitter-collector circuit over line ST to flip-flop TD (FIG. 1) but without effect, since flip-flop TD needs a positive going pulse in order to be reset.

A glance at the table of FIG. 7 discloses that for a chip encoded S, in accordance with the selected five level binary code, generator output terminals P1 and P3 (FIG. 2) should provide a −24 volt signal, while output terminals P2, P4 and P5 provide a −2 volt signal. First taking output terminals P1, and P2 associated with the first voltage divider and resistor R1 of the S chip, −9.3 volts at point V1 is applied through resistor R26 to the base of transistor Q24. It may be remembered that, as was previously described for the initial conditions of the circuitry, transistor Q24 is presently in nonconducting condition placing ground through resistor R39 and diode D27 at the base of transistor Q23, tending to maintain transistor Q23 and, in turn, its associated transistor Q34 in conducting condition. However, the −9.3 volts potential at the base of transistor Q24 biases the transistor, due to the −20.5 volts at its emitter, to conducting condition. As transistor Q24 conducts, the −20.5 volts at its emitter is transferred through its emitter-collector circuit to the anode of diode D27 instead of the formerly applied ground potential G. With −9.3 volts also applied to the base of transistor Q23 from point V1 through resistor R25 and diode D20, diode D27 is back biased "open." Transistor Q23 due to the −6.6 volts at its emitter goes to a nonconducting condition. Transistor Q23, in becoming nonconducting, in turn, applies ground potential through resistors R38 and R46 to the base of its associated transistor Q34, causing transistor Q34 also to become nonconducting. As transistor Q34 becomes nonconducting, −24 volts is applied through resistor R52 to generator output terminal P1, as is required for the encoding of resistor R1 of the chip S in chip socket 1CP1.

At the same time the −9.3 volts at point V1 is applied through resistor R27 and diode D21 to the base of transistor Q25 associated with output terminal P2. With −13.2 volts at its emitter this causes previously nonconducting transistor Q25 to become conducting, interrupting the application of ground potential G to the base of associated transistor Q35 and instead of applying thereto through resistor R47 the potential of −13.2 volts from its emitter. This biases transistor Q35 to conducting condition, causing the signal at output terminal P2 to be transferred from −24 volts to the −2 volts at the emitter of transistor Q35, as is required for the encoding of chip S resistor R1.

Next will be described how the required condition of output terminal P3 at −24 volts and output terminals P4, and P5 at −2 volts for the value of resistor R2 of the S chip in socket 1CP1 (FIG. 1) are attained. Taking the circuitry of output terminal P4 (FIG. 2) first, the −6.5 volt potential at point V2 is applied through resistor R32 to the base of transistor Q30 causing transistor Q30, due to the −21.5 volts at its emitter, to conduct. Transistor Q30, in conducting, applies the −21.5 volts to the anode of diode D31 connected to the base of associated transistor Q29 instead of the formerly applied ground potential G. The −6.5 volts is also applied through resistor R31 and diode D24 to the base of transistor Q29, back biasing diode D31 to open condition, isolating the base of transistor Q29 from the condition of transistor Q30. Transistor Q29 with −6.5 volts applied to its base and −9.3 volts to its emitter is biased to remain in conducting condition, causing −9.3 volts to be applied through its emitter-collector circuit through resistor R49 to the base of associated transistor Q37. This maintains transistor Q37 in conducting condition, applying −2 volts through its emitter-collector circuit to generator output terminal P4, as required for the coded chip resistor R2 in the second voltage divider circuit.

How the −2 volt signal at generator output terminal P5 required for the S coded chip is provided will next be described. The −6.5 volts at point V2 is also applied to the base of transistor Q32 through resistor R34 and diode D26. This causes transistor Q32, due to the −14.7 volts at its emitter, to conduct. As transistor Q32 conducts the −14.7 volts at its emitter as applied through resistor R50 to the base of associated transistor Q38 instead of the previously applied ground G. This causes associated transistor Q38 to follow transistor Q32 into conduction. Transistor Q38, in conducting, transfers the −2 volts potential at its emitter to generator output terminal P5 instead of the previously applied −24 volts.

The output signal of −24 volts is obtained on output terminal P3 as follows: −6.5 volts is also applied from point V2 to the base of transistor Q31 through resistor R33 and diodes D25. Diode D32 is open because transistor Q32 is conducting. With the −13.2 volts at the emitter, transistor Q31 is maintained conducting, applying −13.2 volts to the anode of diode D28. The −6.5 volts is also applied from point V2 to the base of transistor Q28 through resistor R30. This transistor with −23.3 volts at its emitter is biased to conducting condition, transferring the −23.3 volts to the anode of diode D30, instead of the previously applied ground potential G. The −6.5 volts signal is also applied through resistor R29 and diode D23 to the base of transistor Q27 and the cathode of diode D30. This back biases diode D30 to "open" condition, effectively electrically isolating the circuitry of transistor Q28 from affecting transistor Q27. The −6.5 volts applied to the base of transistor Q27, therefore, causes the transistor, due to its −19 volts at its emitter, to conduct and transfer the −19 volts to the anode of diode 29, as was previously the case. The −6.5 volt signal is also applied to the base of transistor Q26 through resistor R28 and diode D22. This back biases both diodes D28 and D29 to "open" condition causing the −6.5 volts at the base of transistor Q26, (due to the transistor emitter being at −6.5 volts) to remain in nonconducting condition. With transistor Q26 in nonconducting condition, an associate transistor Q26, having ground potential G applied to its base through resistors R58 and R48 also remains in nonconducting condition. This causes −24 volts to be maintained to generator output terminal P3 through resistor R54.

Output generator terminals P1 through P5 are now in a coded condition (by means of the voltage signals appearing thereon) represent the letter S in accordance with the coding of the chip in first socket 1CP1 (FIG. 1) of message line ML1 for the message SMITH selected for generation. It may be noted that the binary coded conditions of output terminals P1 through P5 (FIG. 2) for the coding of the letter S code is effected in a few microseconds. The coded condition of the output terminals may be read and transmitted by any suitable equipment (not shown). The period of free running oscillator OSC (BLK 1, FIG. 1) may be selected such that adequate time is available for the coded condition of output terminals P1 through P5 (FIG. 2) to be read and transmitted by any suitable equipment.

At the end of such previously determined period oscillator OSC, (BLK 1, FIG. 1) provides an output pulse to the Chip-Read Counter (BLK 2) to step the Stepping Chip Position Read Selector (BLK 3) to transfer the −24 volt signal from its output terminals SP1 to output terminals SP2, replacing the signal at output terminal SP1 with −6 volts. This selects the M coded chip in the second socket 1CP2 of message lines ML1 (FIG. 1) for insertion in the described voltage divider circuits. The −6 volts applied through terminal SP1 to transistors 1Q1 and 2Q1 associated with the first chip socket biases these transistors to become conducting and apply −24 volts to the cathodes of blocking diodes 1D1, 2D1 of the first chip socket positions. This causes these diodes to conduct, removing resistors R1 and R2 of the S coded chip in socket 1CP1 from the voltage divider networks previously described.

Simultaneously, the −24 volt signal applied through terminal SP2 to transistors 1Q2, 2Q2, associated with the second chip socket position (1CP2—12CP2) biases these transistors to nonconducting condition. As transistor 2Q2 becomes nonconducting, ground potential G is applied through resistor 3R2 to the cathodes of associated diodes 1D2, 2D2. This biases these diodes to "open" condition, placing resistors R1 and R2 for the M coded chip in chip socket 1CP2 (representing the second character of the message, SMITH) in the previously described two voltage divider networks for the chip resistors.

A look at the table of FIG. 7 indicates that the coding of the resistors of chip M places a resistor R1 of 9.1 kilohms in the first described voltage divider network associated with transistor Q20 (FIG. 2) and output terminals P1, P2, and a resistor R2 of 160 kilohms in the second described voltage divider network associated with transistor Q21 (FIG. 2) and output terminals P3, P4 and P5. This causes the voltages of −4.8 volts to appear at point V1 and −16.2 volts at point V2 of the recognizer circuits. The recognizer circuit reacts to these voltage levels at points V1, V2 to provide at generator output terminals P1 through P5, a −24 volt signal at terminals P3, P4, and P5 and a −2 volt signal at output terminals P1 and P2 representing the binary coded output for the letter M.

A general understanding of the operation of the recognizer circuitry of FIG. 2 may best be obtained by studying the affect on the circuitry of various voltage ranges which appear at points V1 and V2 (FIG. 2) of the recognizer circuitry due to the various encoding of the chips. First in relation to generator output terminal P2, whenever the voltage at point V1 is less negative than the −13.2 volts applied to the emitter of transistor Q25, the transistor conducts, causing its associated transistor Q35 also to conduct. Transistor Q35, in conducting, applies −2 volts from its emitter to output terminal P2. On the other hand, whenever the voltage at point V1 is more negative than the −13.2 volts applied to the emitter of transistor Q25, both transistors Q25 and Q35 are placed in nonconducting condition, causing a −24 volt signal to be applied through resistor R53 to output terminal P2.

Thus, by looking at the table of FIG. 7, it can be seen for example, that where the potential at point V1 is indicated as being −4.8 volts (less negative than the emitter voltage of −13.2 volts of transistor Q25), output terminal P2 is provided with what is considered no signal (−2 volts). In the table of FIG. 7 see, for example, the voltage at point V1 for the letters M and N (−4.8 volts). However, where the voltage at point V1 is more negative than the −13.2 volts at the emitter of transistor Q25 as, for example, −21.9 volts for the letters G and C in the table of FIG. 7, a −24 volt signal is applied to output terminal P2.

Similarly, for output terminal P1, it can be seen that, whenever the voltage at point V1 is less negative than the −6.6 volts at the emitter of transistor Q23 (as, for example, −4.8 volts), transistor Q23 is placed into conducting condition, causing its associated transistor Q34 also to conduct. This provides a −2 volt signal at output terminal P1. It should be noted that, under such conditions, associated transistor Q24 is also placed into conducting condition by the −4.8 volts at its base, causing diode D27 to become back biased, electrically isolating transistor Q24 from the base circuit of transistor Q23.

Whenever the voltage at point V1 is more negative than the −6.6 volts at the emitter of transistor Q23, but less negative than the −20.5 volts at the emitter of associated transistor Q24, transistor Q24 is biased into conducting condition, applying −20.5 volts to the anode of diode D27. However, under these conditions, due to the less negative than −20.5 volts applied to the cathode of diode D27, the diode is back biased again electrically isolating transistor Q24 from the base circuit of transistor Q23. This causes transistor Q23 to be placed into nonconducting condition due to the potential at its base from point V1. Accordingly, its associated transistor Q34 is also placed in a nonconducting condition, causing a −24 volt signal to appear at output terminal P1. This occurs, for example, when the voltage at point V1 is at −16.2 volts for the chip coding of the letter A, as seen in table of FIG. 7.

Alternately, when the voltage at point V1 is more negative than the −20.5 volts at the emitter of transistor Q24 (for example, the −21.9 volts at point V1 for the chip coded for the letter G, as seen in the table of FIG. 7), transistor Q24 is biased to nonconducting condition. This causes ground potential G to be applied through resistor R39 and diode D27 (now conducting) to the base of transistor Q23. Ground potential G at such base causes transistor Q23 and its associated transistor Q34 to conduct, applying a −2 volt signal to output terminal P1 (as is seen in table of FIG. 7 for the letter G).

Now with respect to the voltage ranges at point V2 of FIG. 2 and first taking output terminal P5, it is seen that, whenever the voltage at point V2 is more negative than the −14.7 volts at the emitter of transistor Q32, the transistor is biased to nonconducting condition, causing ground potential G to be applied through resistor R36 to the base of its associated transistor Q35. Transistor Q35 is, thus, also biased to nonconducting condition, causing a −24 volt signal to be applied to output terminal P5 (as, for example, for a chip encoded for the letter G, where the voltage at point V2 is −19.9 volts).

Alternately, when the voltage at point V2 is less negative than the −14.7 volts at the emitter of transistor Q32 (as, for example, for a chip encoded for the letter C, where the voltage at point V2 is −9.3 volts), transistor Q32 is biased to conduct and so forces its associated transistor Q38 also to conduct. Transistor Q38, in conducting, causes a −2 volt signal to be applied to output terminal P5 (as is seen in the table of FIG. 7 for the letter C).

For the output terminal P4, whenever the potential at point V2 is less negative than the −9.3 volts at the emitter of transistor Q29 (as, for example, for a chip encoded for the letter A, where the potential is −4.8 volts at point V2), transistor Q29 and its associated transistor Q37 are caused to conduct, applying −2 volts to output terminal P4.

Whenever the voltage at point V2 is more negative than the −9.3 volts at the emitter of transistor Q29 but less negative than the −21.5 volts at the emitter of transistor Q30 (as, for example, the −19.9 volts at point V2 for a chip encoded for the letter B), transistor Q30 is caused to conduct, applying −21.5 volts to the anode of diode D31 which is, thus, biased open, electrically isolating transistor Q30 from the circuit of transistor Q29. Transistor Q29 is biased by the −19.9 volts at its base to nonconducting condition. Its associated transistor Q37 is also placed in nonconducting condition applying a −24 volt signal over resistor R55 to output terminal P4.

However, whenever the voltage at point V2 is more negative than the −21.5 volts at the emitter of transistor Q30 (as, for example, the −24 volts at point V2 for a chip encoded for the letter P, as seen in table at FIG. 7), transistor Q30 is biased to nonconducting condition, applying ground potential G through resistor R43 and diode D31 to the base of transistor Q29. This causes transistor Q29 and its associated transistor Q37 to be placed into conducting condition, causing a −2 volt signal to be applied to output terminal P4 (as is indicated in the table of FIG. 7 for the letter P).

For the last output terminal to be considered, terminal P3, whenever the voltage at point V2 is less negative than the −6.6 volts at the emitter of transistor Q26 (as, for example, for a chip encoded for the letter E, where the voltage at point V2 is −4.8 volts), transistor Q26 is caused to conduct along with its associated transistor Q36. Transistor Q36, in conducting, applies a −2 volt signal to output terminal P3 (as is indicated in the table for the letter E).

Whenever the voltage at point V2 is more negative than the −6.6 volts at the emitter of transistor Q26 but less negative than the −13.2 volts at the emitter of transistor Q31 (as, for example, the −12.7 volts at point V2 for a chip encoded for the letter D as seen in the table of FIG. 7), the following occurs: With −12.7 volts at point V2 transistor Q26 would normally be biased at its base to nonconducting condition. The same voltage is applied through resistors R33 and diode D25 to the base of transistor Q31 which would, thus, normally be caused to conduct. However, the −12.7 volt also appears at the base of transistor Q32 which is caused thereby to conduct and, thus, apply the −14.7 volts at its emitter through diode D32 to the base of transistor Q31. This biases transistor Q31 to be nonconducting instead of conducting. Ground potential G is thus, applied through resistor R44 and diode D28, now conducting, to the base of transistor Q26. Transistor Q26 is, thus, caused to conduct. Its associated transistor Q36 follows, conducting to apply −2 volts to terminal P3 (see the table of FIG. 7). Diode D29 is back biased by the ground potential G at its cathode to electrically isolate transistors Q27 and Q28 from the circuit of transistor Q26.

The effects of voltages at point V2 of values more negative than −13.2 volts but less negative than the −19 volts at the emitter of transistor Q27, for those more negative than −19 volts but less negative than the −23.3 volts at emitter of transistor Q28 can easily be ascertained by the reader.

The effects of −24 volts at point V2 has already been described in relation to explaining the initial condition of the circuitry.

From the foregoing, it may be readily ascertained from the table of FIG. 7 and the recognizer circuitry of FIG. 2 what the binary coded output combination at generator output terminals P1 through P5 are for the remaining encoded chips in the message presently being generated, i.e., SMITH.

It should be noted that, since the recognizer circuitry detects the encoding of the chips by reacting to voltage ranges or steps of voltages appearing at point V1 and V2 (FIG. 2), resistors R1 and R2, utilized in the various chips 12 (FIG. 9) to encode them for different characters, need not be of fine ohmic tolerance. In fact, although for the described tested embodiment of the subject generator resistor R1 was previously tabulated as being selected (in accordance with a predetermined code) of 9.1 kilohms, 43 kilohms and 160 kilohms, 680 kilohms to code the chips, it was found that its selected ohmic value could be varied by at least 50 percent and the generator would still operate properly. For example, proper operation is obtained, when a chip resistor R1 which would normally be selected of 9.1 kilohms is varied in value up to 30 kilohms, approximately a 300 percent change; when resistor R1 normally of 43 ohms is varied up to 100 kilohms, approximately a 200 percent increase; and when resistor R1, normally of 160 kilohms is increased up to 500 kilohms; a change of approximately 400 percent. This feature allows the utilization of economical circuit components.

It should also be noted that, since the recognizer circuitry reacts to voltage ranges, fluctuations in line voltage or poor voltage regulation within relatively wide limits do not adversely affect the operation of the subject binary code generator. This is so, since variations in the applied line voltages cause proportionate changes in the voltage ranges which need to be detected by the recognizer circuitry. The generator, therefore, remains operational. This feature increases the reliability of the message generator by minimizing errors due to voltage fluctuations and makes possible its use in certain marginal applications where binary code generators could otherwise not be used.

Chip-Read Counter (BLK 2, FIG. 3), as it receives timed pulses from oscillator OSC (BLK 1), continues to cause Stepping Chip Position Read Selector (BLK 3) to transfer the −24 volt signal from output terminal to output terminal (SP2, SP3, SP4, SP5), thereby, sequentially inserting the coded chips 12 of the message SMITH into the described voltage divider circuits of FIGS. 1 and 2. This causes a binary coded output, representing the character of each chip to appear character by character at generator output terminals P1 through P5 (FIG. 2).

As the Stepping Chip Position Read Selector (BLK 3, FIG. 3) transfers its −24 volt output from terminal SP5 (FIG. 1) to terminal SP6 associated with the sixth chip socket 1CP6 (not shown) of selected message line ML1, which socket is presently empty, sixth chip position transistors 1Q6 and 2Q6 (not shown) are biased to nonconducting condition. Transistor 2Q6 applies ground potential G over resistor 3R6 (not shown) to the cathodes of blocking diodes 1D6 and 2D6 (not shown) associated with sixth chip socket 1CP6. The absence of a chip in sixth socket 1CP6 (not shown) provides an "open" circuit condition at the anodes of diodes 1D6, 2D6 and 3D6 and 4D6 (also not shown). This causes bottom diodes 3D6 and 4D6 to remain in "open" condition at the same time that diodes 3D5 and 4D5 associated with fifth chip socket 1CP5 (not shown) return to "open" condition. All the chip sockets (1—12CP1—32) of FIG. 1, therefore, are now again effectively electrically isolated from the recognizer circuitry of FIG. 2. This causes the recognizer circuitry to return to the initial condition, previously described.

In returning to such initial condition, transistors Q20 and Q21 (FIG. 2) are again biased (by the −24 volts applied to their respective bases through resistors R20, R22, respectively) to nonconducting condition. This causes −24 volts again to appear through resistors R21, R23 to points V1 and V2, respectively. The recognizer circuitry, thus, generates the binary coded output previously described, wherein a −24 volt signal appears at output generator terminals P2, P3 and P5 and a −2 volt signal appears at output generator terminals P1 and P4.

In addition, as was previously described, as −24 volts is applied from point V1 to the base of transistor Q22 through resistor R24, the transistor and its cascaded transistor Q33 are biased to return to nonconducting condition. As transistor Q33 returns to nonconducting condition, ground potential G is reapplied through resistor R59 over line ST to the input of flip-flop TD (FIG. 1) instead of the previously applied −24 volts. This ground pulse causes flip-flop TD to be reset to its initial condition in which a −24 volt signal is transmitted from its output over supply line B to oscillator OSC (BLK 1, FIG. 3), again blocking the output of the oscillator, thereby terminating the stepping of the Stepping Chip Position Read Selector (BLK 3), indicating the end of generation of the selected message SMITH inserted in message line ML1.

Flip-flop TD (FIG. 1) also applies a −24 volt signal over line B to an inverter INV (FIG. 3), which, in turn, applies ground potential G to Chip-Read Counter (BLK 2), resetting the Counter to its initial condition. This causes Stepping Chip Position Read Selector (BLK 3) to transfer the −24 volt signal from its sixth output terminal SP6 (not shown) back to its first output terminal SP1 in preparation for the next stepping operation.

The −24 volts output of flip-flop TD (FIG. 1) is simultaneously applied over line L1 to the base of transistor Q10 and to the base of transistor Q12. Such voltage at the base of transistor Q10 causes it to conduct. Transistor Q10, in conducting, removes the −24 volts from the left side of capacitor C12 and instead reapplies ground potential G thereto through its emitter-collector circuit. This removes the previously described interlock from the pushbutton message selector circuits and prepares these circuits for selection of the next message to be generated.

Transistor Q12 inverts the −24 volt signal applied to its base from flip-flop TD to a −4 volt signal which is then applied to the left side of capacitor C14 in the base circuit of transistor Q11. Capacitor C14 causes a positive going pulse to be applied through resistor R16 to the base of transistor Q11, which pulse is sufficiently positive to cause transistor Q11 to become momentarily nonconducting. Transistor Q11 remains nonconducting through its emitter-collector circuit a sufficient time to remove ground potential G from the anode of the silicon controlled rectifiers (1SCR—12SCR) of all the message lines ML1—ML12. This causes the previously fired rectifier 1SCR for first message line ML1 to extinguish and return to nonconducting condition. As rectifier 1SCR ceases to conduct, ground potential G is removed from its cathode, causing indicating lamp 1LP of message line ML1 to become extinguished. As the lamp goes out, the end of generation of the selected message of message line ML1 is indicated visually to the operator of the generator.

It may be noted that, as rectifier 1SCR for first message line ML1 becomes nonconducting, ground potential G is also removed from chip prongs T3 of all the chips 12 in message line ML1, indicating the end of selection of line ML1. As the positive going pulse at the base of transistor Q11 subsides, transistor Q11 returns to conducting condition, again applying ground potential G through its emitter-collector circuit to the anodes of the silicon controlled rectifiers (1SCR—12SCR) for all the message line ML1—ML12, again preparing these rectifiers for subsequent selective firing through their gate circuits upon selection of the next message to be generated by means of actuation of a pushbutton (1PB—12PB).

Next will be described the operation of the flip-flop circuit of FIG. 4. This circuit is used as flip-flop TD (FIG. 1) and for flip-flops FF1 to FF5 (BLK 2, FIG. 3 and FIG. 5). The circuit provides approximately −22 volts at the output terminal designated 1 (FIG. 4) and approximately −4 volts at output terminal designated 0. Upon operation of the flip-flop, the voltage signals at output terminals 1 and 0 are interchanged such that the −22 volts then appears at terminal 0, while −4 volts appears at terminal 1. The reset input in the FIG. 4 circuit may be from a manually actuated pushbutton.

In operation, assume that a manually initiated reset ground pulse is applied through the reset input at diode D1 to the base of transistor Q1. This causes transistor Q1 initially to be nonconducting and transistor Q2 to be conducting. In such condition, these transistors provide −4 volts at terminal 0 connected to the collector of transistor Q2 and −22 volts at terminal 1 connected to the collector of transistor Q1.

Next assume that a positive going pulse is applied to input terminal "INPUT 1." Capacitor C4 applies this positive pulse through diode D4 to the base of transistor Q2, causing the transistor to become nonconducting. This same pulse is applied through capacitor C1 and diode D2 to the base of transistor Q1 but without effect, since transistor Q1 is already in nonconducting condition.

As transistor Q2 becomes nonconducting, the output at terminal 0 changes from −4 to −22 volts; the latter voltage being applied to the terminal through resistor R2. This −22 volts is also applied through resistor R4 to the base of transistor Q1, causing transistor Q1 to conduct through its emitter-collector circuit. As transistor Q1 conducts, it applies −4 volts from ground potential G through resistor R10 and its emitter-collector circuit to output terminal 1. The output at terminal 1 is, thus, changed from −22 volts to −4 volts. This action or operation of the circuit may be termed "flipped," since the voltage signals at output terminals 1 and 0 have been interchanged.

Next assume that a positive going pulse is applied to input terminal 2. This causes transistor Q1 to return to nonconducting condition, again applying −22 volts through resistor R1 to output terminal 1, while transistor Q2 again becomes conducting, applying −4 volts through base resistor R10 and its emitter-collector circuit to output terminal 0. It is, thus, seen that, upon application of a positive going input pulse to either of the input terminals INPUT 1 or INPUT 2, since both are connected through capacitors and diodes to the base circuits of both transistors Q1 and Q2, the transistors are caused to reverse their then present condition of conduction. A next input pulse causes the transistors to revert back to their initial condition, and so on. Thus, a positive going pulse on either terminals of INPUT 1 or INPUT 2 causes the circuit to "flip."

In the utilization of the circuit of FIG. 4 for flip-flop TD of FIG. 1, only the terminal designated 1 OUT is used, supplying −22 volts in its initial condition and when the circuit is actuated, or "flipped," supplying −4 volts over lines B and L1. In such application, one of the input terminals of the flip-flop circuit (for example, INPUT 1, FIG. 4) is connected to the left side of resistor R11 in the FIG. 1 circuitry, while the other input terminal (INPUT 2) is connected to the incoming line, designated ST, from FIG. 2.

Figure 5:
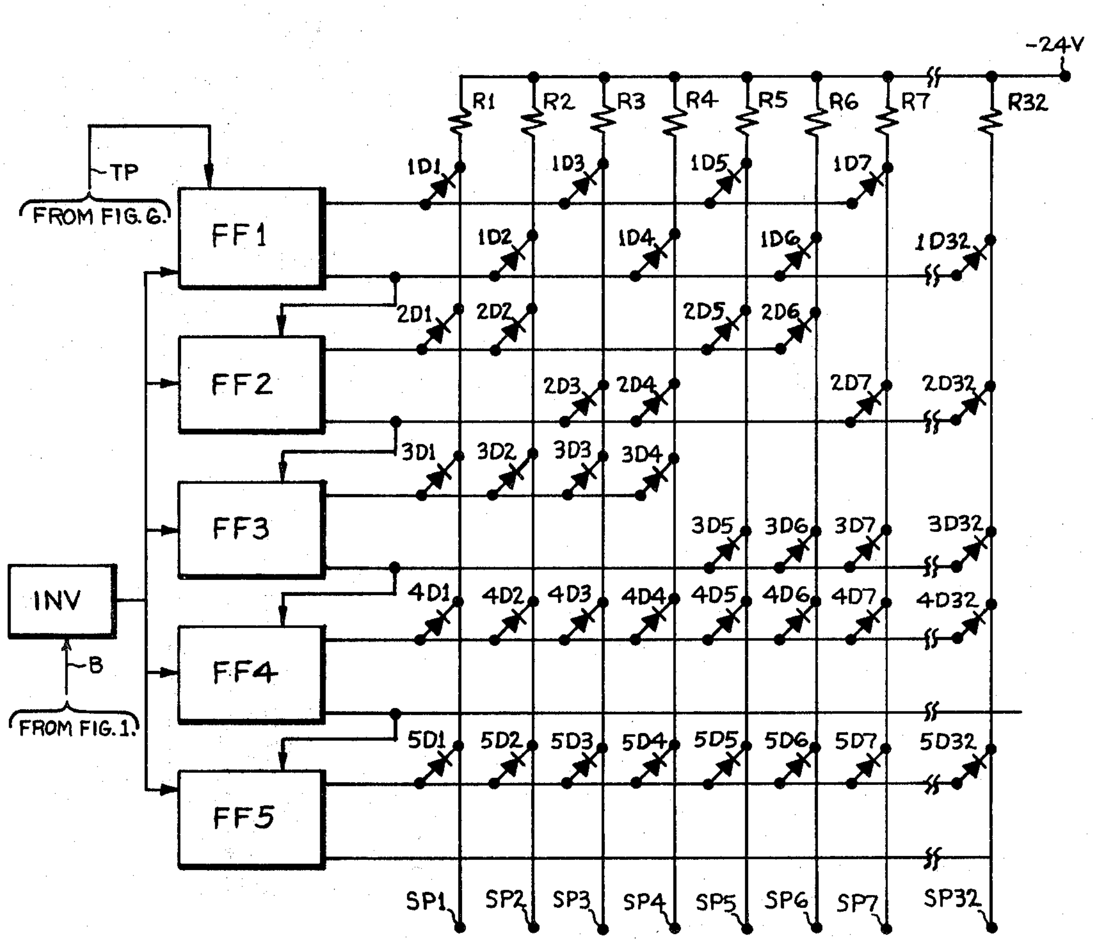
FIG. 5 is a simplified schematic wiring diagram of a diode matrix with associated flip-flops FF1 through FF5 indicated in block form as providing a serial counter for stepping an output signal along the matrix output terminals SP1 to SP32; the matrix being represented in FIG. 3 by the two blocks designated BLK 2 and BLK 3.

In the application of the FIG. 4 circuit to the flip-flops of the Chip-Read Counter (BLK 2, FIGS. 2 and 5), one of the input terminals of the first flip-flop FF1 (FIG. 5) receives the pulses from oscillator OSC (BLK 1, FIG. 3) over line TP. The flip-flop outputs to the diode matrix of FIG. 5 are: terminal 1 (FIG. 4) is the top terminal of each flip-flop in FIG. 5 (FF1—FF5) and provides initially approximately a −24 volt signal to the diode matrix. Terminal 0 (FIG. 4) is the bottom terminal of each flip-flop (FF1—FF5) in FIG. 5 and provides approximately a −6 volt signal initially to the diode matrix. This bottom or terminal 0 of each of the flip-flops FF1—FF4 is also connected to one of the inputs of the next successive flip-flop. For example, the bottom output terminal of flip-flop FF1, as is shown in the FIG. 5 circuit, is connected to the input of flip-flop FF2 and so on. In this utilization of the flip-flop circuit of FIG. 4, only one input terminal is utilized, say terminal INPUT 1.

In operation, each pulse from oscillator OSC (FIG. 3) to the first flip-flop FF1 (FIG. 5) over line TP pulses that flip-flop causing it to "flip." As flip-flop FF1 "flips" on each second positive going pulse received from oscillator OSC, it provides from its bottom output terminal a positive going pulse to the next successive flip-flop FF2. This causes the second flip-flop FF2 to "flip" every other or second pulse received from the oscillator by flip-flop FF1. The third flip-flop FF3 "flips" every eighth pulse received by flip-flop FF1 from oscillator OSC (FIG. 3), since at such eighth pulse it receives a positive going pulse from the bottom terminal of flip-flop FF2 (FIG. 5). In a similar manner, flip-flop FF4 "flips" every 16th pulse received by flip-flop FF1 from the oscillator, since it receives a positive going pulse at such time from flip-flop FF3. Likewise, flip-flop FF5 "flips" every 32nd pulse received by flip-flop FF1 over line TP from oscillator OSC, (FIG. 3), since it then receives a positive going pulse from flip-flop FF4 (FIG. 5). Flip-flops FF1 through FF5, thus, constitutes a straight counter and are reset to zero by a positive going reset pulse applied to all the flip-flops FF1 to FF5 through inverter INV over line B from flip-flop TD (FIG. 1), as was previously described.

In such initial or zero condition, as was described previously, the diode matrix of FIG. 5 applies −24 volts to the first chip socket position of FIG. 1 over its output terminal SP1, while the remaining terminals SP2—SP32 apply approximately −6 volts to the FIG. 1 circuitry. To obtain this initial condition, the top or terminal 1 of each of the flip-flops FF1 to FF5 (FIG. 5) supply −22 volts to the diode matrix, while their respective bottom or terminals 0 supply −4 volts to the diode matrix. Since all the diodes (1D1—5D1) connected to terminal SP1 have −22 volts applied (by flip-flops FF1—FF5) to their anodes and also −22 volts at their cathodes through resistor R1, they are all maintained in "open" or nonconducting condition. With all the diodes connected to terminal SP1 in "open" condition, the −24 volts applied through resistor R1 appears at output terminal SP1.

Under such conditions, each of the other remaining output terminals SP2 through SP32 have at least one of their matrix diodes in conducting condition. For example, diode 1D2 connected to output terminal SP2 has approximately −4 volts applied from flip-flop FF1 to its anode, while −24 volts is applied through resistor R2 to its cathode. Thus, diode 1D2 is biased to conduct, providing approximately −6 volts to output terminal SP2. The same can be ascertained for the remaining terminals (SP3—SP32).

Next assume the application of a first pulse from oscillator OSC (FIG. 3) over line TP to flip-flop FF1 (FIG. 5). At such pulse flip-flop FF1 "flips" interchanging the voltage signals at its output terminals, thereby, applying −6 volts to the anodes of the diodes (1D1, 1D3, 1D5, 1D7, etc.) connected to its top or terminal 1 and −22 volts to the anodes of the diodes (1D2, 1D4, 1D6, 1D8, etc.) connected to its bottom or terminal 0. The rest of the flip-flops (FF2—FF5) remain in their initial conditions. With such transfer of voltage signals at the output terminals flip-flop FF1, diode 1D1 becomes conducting, while diode 1D2 becomes nonconducting or "open." Since all the remaining diodes connected to output terminal SP1 are also "open," as was previously stated, −24 volts is now applied through resistor R2 to output terminal SP2, indicating that the second chip socket position of FIG. 1 is to be read. At the same time, now conducting diode 1D1 applies approximately −6 volts to output terminal SP1. In this manner, the circuit of FIG. 5 "steps" the −24 volt signal from its first output terminal SP1 to output terminal SP2.

It can readily be seen that the application of the next pulse, flip-flop FF2 is caused to "flip," as was previously stated, causing a transfer of the −24 volts from output terminal SP2 of the diode matrix to output terminal SP3. As flip-flops FF1 through FF5 continue to function as a straight counter their outputs are applied to the diode matrix, causing the −24 volt signal to be stepped from output terminal SP1 through to terminal SP32 sequentially with each successive incoming pulse from oscillator OSC (FIG. 1) applied to flip-flop FF1 (FIG. 5).

Figure 6:
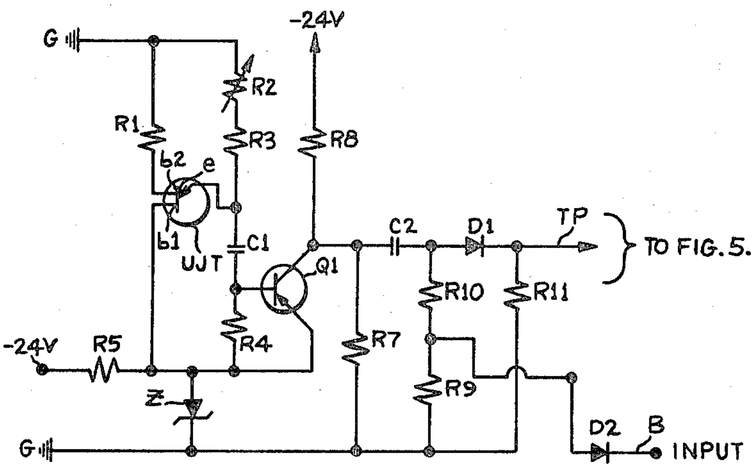
FIG. 6 is a simplified schematic wiring diagram of a free running, relaxation type oscillator which serves as a clock for the system and is shown in FIG. 3 as the block designated BLK 1.

The circuit of FIG. 6 for a unijunction, free running relaxation oscillator applies timed pulses over output terminal TP unless the pulses are blocked by the application of a −24 volt signal to input terminal B. In operation, capacitor C1 charges through variable resistor R2 and resistors R3, R4 and R5. When capacitor C1 has charged sufficiently, unijunction transistor UJT fires, discharging capacitor C1 through resistor R1. As capacitor C1 discharges, a negative going pulse is applied to the base of transistor Q1, causing the transistor to fire and conduct through its emitter-collector circuit. Transistor Q1, in conducting, applies a positive going pulse through capacitor C2 and diode D1 to output terminal TP, unless a −22 volt signal is present at the right-hand side of capacitor C2; being applied over line B through diode D2 and resistor R10. After a predetermined time capacitor C1 again charges sufficiently to repeat the firing of the unijunction transistor UJT and again apply a positive going pulse over line TP provided a blocking signal is not being received over line B. The period of these output pulses is determined by the charging and discharging rate of capacitor C1, which rate, in turn, is determined by the ohmic values of the resistors in its charging and discharging paths. As was previously stated, the period of the oscillator is adjusted to provide sufficient time for transmitting equipment to read and transmit the binary coded condition of output terminals P1—P5 (FIG. 1) after each generation of a binary coded character thereon.

Zenor diode Z (FIG. 6) is provided as a voltage regulator to maintain at the junction of resistors R4 and R5 a potential of approximately −12 volts above ground.

In summary, it can be seen from the foregoing description that the subject generator is economical to manufacture and operate, is reliable, operates at practically unlimited electronic speeds, is free from mechanical wear of the message input components and allows great flexibility in setting up messages to be generated thereby. In addition, it is readily adaptable to generating binary codes of levels other than the five level described, either by providing a different number of resistors for each of the described voltage divider circuits, or by providing more or less voltage dividers and associated recognizer circuitry. Furthermore, generation of the binary coded signals need not be initiated through pushbuttons, as is the FIG. 1 circuitry, but may be accomplished through any other mechanisms for selecting an encoded chip or an entire message line of chips for generation. For example, selection may be by a pair of relay contacts, applying a firing potential to the gate of the silicon controlled rectifier of a message line. It should be recognized, that the encoded resistor chips need not be of the "plug-in" type but may be permanently interconnected in the voltage divider circuitry. Additionally, they may be selectively inserted into the voltage divider circuitry (for "reading" by the generator mechanism) by means of keyboard actuated contacts, or through a stepping switch type mechanism (electronic or electromechanical). Such stepping mechanism (for selectively interconnecting predetermined encoded resistors into the described voltage divider and recognizer circuitry to generate a binary code) may be subject to timing mechanism and used to provide a time and/or date output to response to operation of such timing mechanism; the encoded resistors being interconnected into the generator circuitry by such mechanism to generate periodically coded time and date signals.

As changes can be made in the above-described construction and many apparently different embodiments of this invention can be made without departing from the scope thereof, it is intended that all matter contained in the above description or shown on the accompanying drawings be interpreted as illustrative only and not in a limiting sense.

We claim:

1. A system for generating coded binary symbols at a plurality of output terminals to provide intelligible binary language output comprising:

a plurality of voltage divider networks, each one of which is associated with certain different ones of said output terminals;

a plurality of resistors for each of said voltage divider networks;

said resistors being of different ohmic values equal in number to the possible combinations of the presence or absence of electrical signals which may be provided at the said output terminals associated with its respective divider network;

said resistors being of the "plug-" type;

resistor available circuit means for each of said dividers into which said resistors may be plugged making them available for selective interconnection into other circuitry;

means for simultaneously inserting available resistors in their associated respective voltage divider networks for reading, said insertion in each of said networks causing an associated potential step at a "takeoff" point in each associated networks of a level associated with the ohmic value of the inserted resistor; and means associated with each of said voltage divider networks and being operatively responsive to said predetermined potential steps for providing a binary coded output at the said output terminals associated with such divider in the form of the presence or absence of an electrical signal thereat in accordance with a certain coding of the ohmic value of said inserted resistors and, in turn, said certain potential steps, the signal condition combination of all said output terminals of all of said voltage divider networks being available simultaneously to provide a binary coded output at a code level equal in number to the total number of output terminals.

2. A system as set forth in claim 1 wherein there are further provided stepping selector means for sequentially inserting preselected available resistors in a predetermined order into their associated respective divider networks to provide associated potential steps sequentially, and, in turn binary output signals at said output terminals.

3. A system as set forth in claim 2 wherein said resistors are inserted in sets in said availability circuits forming various messages, and there are provided means for selecting any one of said resistor message sets for selective sequential insertion into said divider networks by said stepping selective means.

4. A generator of binary coded symbols in accordance with a certain level of binary code, a said generator including:

a plurality of resistors selected from resistors of predetermined ohmic values which differ in number one from the other equal to the level of the binary code being generated;

circuit interconnecting means adapted for selective interconnection of said resistors therein to make said resistor ohmic values available for reading by said generator;

means for providing voltages at a predetermined output point, said voltage providing means being responsive to the ohmic values of said available resistors which are selectively interconnected at its input for providing voltage ranges associated with said predetermined ohmic values;

means for selectively interconnecting said available resistors of said availability circuit to the input of said voltage providing means in a predetermined sequence for causing said voltage means to provide voltage ranges in accordance with the ohmic values of the available resistors interconnected, characterized in that, the different ohmic values of said resistors and the associated voltage ranges generated by said voltage providing means are equal in number to the maximum possible combinations of the binary code being generated and are each encoded to represent different symbols; and that there are provided means having output terminals equal in number to the level of the binary code being generated, said means being operatively responsive to said predetermined voltage ranges of said voltage providing means for providing binary coded output at said output terminals in the form of combinations of the presence or absence of electrical signals thereat in accordance with the said certain coding of certain said resistors and, in turn, said voltage ranges.

5. A generator as set forth in claim 4 wherein said voltage range responsive means comprises, a plurality of electrical switching means, one for each of its said output terminals, for switching to its associated terminal a certain electrical signal only in response to an associated one of said potential ranges.

6. A generator as set forth in claim 4 wherein there is provided:

a second set of resistors selected of ohmic values which differ in number in accordance with the maximum combinations possible of the binary code to be generated by said second set;

a second availability circuit into which said second set of resistors may be selectively interconnected;

a second voltage providing means responsive to said second set of available resistors for providing a second set of predetermined voltage ranges associated with the ohmic values of said second set of resistors;

second means for selectively interconnecting said second set of available resistors to the input of said second voltage providing means; and a second set of means having a second set of output terminals equal in number to the level of the binary code being generated by said second set of resistors and being operatively responsive to said second set of predetermined voltage ranges for providing a binary coded electrical signal combinations at said second set of output terminals, characterized in that, said first and second means for selectively interconnecting said sets of resistors to the input of their said respective first and second voltage range providing means effect simultaneous interconnection of said two sets of available resistors in said first and second voltage range providing means to provide at both said sets of output terminals a binary coded output at a code level equal to the aggregate number of said output terminals of said first and second means responsive to said voltage ranges.